3,487,150
DEXTRAN SULPHATE TREATMENT OF
PEPTIC ULCERS
William A. Barnes, Ho Ho Kus, N.J., and Saverio F. Redo, New York, N.Y., assignors to Cornell Research Foundation, Inc., Ithaca, N.Y., a corporation of New York
No Drawing. Filed Oct. 23, 1965, Ser. No. 504,117
Int. Cl. A61k 27/00
U.S. Cl. 424—180        4 Claims

ABSTRACT OF THE DISCLOSURE

The use of dextran sulphate, preferably in the form of sodium or potassium dextran sulphate, containing at least 13% sulphur for oral administration in the treatment and inhibition of peptic ulcers in dosage units of 8–20 parts by weight per 60,000 parts by weight of the mammal is disclosed. Dextran sulphate has fully anti-peptic activity and surprisingly causes no side activity such as anti-coagulation of the blood. The anti-peptic activity is found in vivo to be higher than that of other sulphated polysaccharides.

---

The present invention relates to the treatment of peptic ulcers and, more particularly, to a composition including dextran sulphate and the oral administration of such composition in the treatment of peptic ulcers.

For many years it has been recognized that a component of gastric juice is an inhibitor of peptic activity. It has been generally assumed that the active components of the inhibitor of peptic activity found in gastric juice are degradation products of proteins, such as polypeptides, peptides or amino acids.

In 1960 it was reported that an inhibitor of peptic activity could be recovered by dialysis from gastric juice, the inhibitor being effective in acid environment (Redo et al.; "An Inhibitor of Peptic Activity Recoverable From Gastric Juice"; Surg. Forum, vol. 10, page 129; 1960). This inhibitory activity has also been found in saliva and urine. The study of such inhibitory fractions by chromatographic methods have shown several amino acids; however, when these and other amino acids are used singly or in various combination, they fail to reproduce the anti-peptic activity of the original fraction.

It has also been known that certain polysaccharides diminish the ulcerogenic activity of acid-pepsin combinations (e.g. Houck et al.; "The Inhibition of Pepsin and Peptic Ulcers"; Gastroenterology; vol. 39, page 196; 1960), such polysaccharides including heparin, chondroitin sulphate, and carrageenin. However, in spite of the knowledge that such materials which inhibit ulcerogenic activity, a more effective treatment for the prevention and inhibition of peptic ulcers has been desired.

It is therefore an object of the present invention to provide a more effective treatment for peptic ulcers.

It is another object of the present invention to provide a method and composition for the successful treatment of peptic ulcers.

It is another object of the present invention to provide a method and composition which will inhibit the formation of peptic ulcers.

These and other objects and the nature and advantages of the present invention will become apparent from the following description.

The present invention provides, generally, the oral administration of dextran sulphate, the dextran sulphate dissolving in the stomach to inhibit peptic activity.

Dextran sulphate has been used in the past as an anticoagulant in which it has been administered intravenously or intramuscularly (The Merck Index; 7th Edition; 1960; page 331). Dextran sulphate has also been used, in smaller quantities, for the treatment of hyperipemia. In this latter connection, the patent of Morii et al., No. 3,126,320, shows that dextran sulphate may be administered orally, but only if provided with an enteric coating to prevent dissolving of the dextran sulphate in the stomach.

In the present invention, and directly contrary to the teaching of Morii et al., the dextran sulphate is provided so that it must dissolve in the stomach. Dextran sulphate may be administered orally to both treat ulcers already present and to inhibit the formation of ulcers in mammals when the mammals are subject to an ulcer causing environment, such as during the administration of corticosteroids, during the acute phase of extensive burns, with certain brain lesions, or in patients with a past history of ulcer subjected to special stress producing situations.

It is essential to the present invention that the dextran sulphate composition which is orally administered be capable of dissolving in the stomach where it may contact the peptic ulcer or mix with the ulcer producing material in contact with the ulcer forming areas. Gastric juice is generally recognized to be strongly acidic, the pH being generally below 3.0. It therefore follows that the dextran sulphate must be capable of dissolving at a pH below 3.0 (i.e., it is acid soluble). Similarly, the carrier for the dextran sulphate must also dissolve at a pH below 3.0 to prevent the carrier from surrounding the dextran sulphate and preventing dissolution thereof while in the stomach. Thus, any enteric carrier would not be suitable unless it were to act merely as a matrix from which the dextran sulphate could be leeched while in the stomach. The dextran sulphate should preferably be used in the form of a water soluble alkali metal salt, such as sodium or potassium dextran sulphate.

The conventional tablet forming carriers such as starch, sucrose, dextrin, lactose, talc and/or glucose have been found to be successful carriers for dextran sulphate in the treatment of peptic ulcers. In addition, the dextran sulphate, preferably in the form of a water soluble salt, may be merely dissolved in water and administered orally as a liquid. The dextran sulphate may also be incorporated into chewing gum from which it will be leeched by saliva and carried to the stomach or it may be enclosed in a suitable gelatin capsule along with powdered filler materials.

In the treatment of a 60 kg. mammal, it has been found that a dosage unit of from about 1 to 2 grams, taken three or four times daily will be effective in both preventing the formation of peptic ulcers and eliminating already formed peptic ulcers, although higher dosages may be desirable for the treatment of already formed ulcers. A daily dosage of 50 mg. for a 400 gram mammal has proven highly effective in preventing ulceration in an extreme situation. Therefore, the daily dosage should be about 8–10 parts by weight of the dextran sulphate per 60,000 parts by weight of the mammal.

The dextran sulphate used in the present invention may be prepared by known processes, for example, by using chlorosulphonic acid in pyridine or in formamide in the presence of pyridine. For reasons of processing, however, it has been found that the sulphate used is preferably that prepared in formamide using chlorosulphonic acid in the absence of pyridine. Dextran sulphate may also be produced by esterifying dextran, an anhydroglucose polymer produced by numerous strains of Leuconostac and closely related bacteria in sucrose containing solutions, with sulfuric acid. Suitably, the sulphur content of the dextran sulphate is above 13% and more preferably above 15%.

When tablets containing sodium dextran sulphate were made into gastric juice soluble preparations according to the present invention and tested, such preparations resulted in fully anti-peptic activity and, moreover, surprisingly did not cause side activity such as anti-coagulation of the blood. It is thus possible, by means of the present invention, to use the oral administration of dextran sulphate safely and over extended periods in the treatment of peptic ulcers.

The following examples are given to illustrate particular embodiments of the invention, but it is to be understood that the examples are not intended to limit the invention:

EXAMPLE I

Tests were conducted in vitro utilizing the technique of Mett as modified by Nirenstein and Schiff. The anti-peptic effects of dextran sulphate were compared with the effects of heparin, carrageenin, chondroitin sulphate, sodium chloride, a combination of amino acids in concentrations equal to those found in naturally occuring inhibitor of pepsin obtained from gastric juice, and a control. The results are tabulated in Table I.

TABLE I.—INHIBITION OF PEPTIC ACTIVITY USING THE METHOD OF METT

| Material | Amount, mgm. | Peptic Activity in Mett Units, Average of 6 Determinations | Percent Inhibition |
| --- | --- | --- | --- |
| Control | | 1,600 | |
| NaCl | 100 | 780 | 52 |
| Amino acid mixture | 100 | 730 | 55 |
| Chondroitin SO$_4$ | 25 | 1,047 | 35 |
| Do | 50 | 598 | 63 |
| Heparin | 25 | 89 | 94 |
| Do | 50 | 53 | 96 |
| Carrageenin | 25 | 94 | 93 |
| Do | 50 | 40 | 97 |
| Dextran SO$_4$ | 25 | 87 | 95 |
| Do | 50 | 40 | 97 |

EXAMPLE II

Further in vitro studies were made utilizing the technique of Klotz and Duvall using radioactive iodinated serum albumin. Once again the anti-peptic effects of dextran sulphate, heparin, carrageenin, chondroitin sulphate, an amino acids mixture, and sodium chloride were compared. The results are tabulated in Table II.

TABLE II.—INHIBITION OF PEPTIC ACTIVITY USING A METHOD INVOLVING RADIOACTIVE IODINATED SERUM ALBUMIN

| Material | Amount, mgm. | Percent Inhibition |
| --- | --- | --- |
| NaCl | 50 | 15 |
| Amino acid mixture | 40 | 62 |
| Chondroitin SO$_4$ | 9 | 70 |
| Do | 18 | 87 |
| Heparin | 9 | 89 |
| Do | 18 | 94 |
| Carrageenin | 9 | 97 |
| Do | 18 | |
| Dextran SO$_4$ | 9 | 95 |
| Do | 18 | 95 |

As reproduced in Tables I and II, the in vitro tests show that dextran sulphate, carrageenin and heparin inhibited peptic activity more than 90% as determined by both the methods employed. The effect of chondroitin sulphate was less; sodium chloride and the mixture of amino acids produced the least inhibition.

EXAMPLE III

Further studies were carried out in vivo to determine the inhibition of ulcer formation in rats using a modification of the method described by Shay. All the rats, approximately 235, were fasted for 48–72 hours, depending on their weight to provide approximate weights of about 400 grams. Under light ether anesthesia, a 2 cm. incision was made in the abdomen just to the left of the midline of each rat. A segment of bowel was drawn into the wound and into the bowel was injected a quantity of urethane (0.165 gm./cc.) equal to 0.3 cc. per 150 grams body weight of each animal injected. The stomach was exposed, being careful not to grasp it with the forceps or to handle it too roughly, and the pylorus was ligated with #00 silk tie. Care was taken to avoid ligating gastric vessels. The wound was closed with silk and a collodion dressing was applied. The rat was allowed water ad lib but no food.

The material being evaluated for anti-peptic activity was introduced into the stomach via a tube passed through the mouth and esophagus. All such materials were mixed in 1 cc. of 0.9% saline solution, and the pH was then adjusted to 1.5 using 0.1 N hydrochloric acid. The control solution was 1 cc. of 0.9% saline with a pH of 1.5.

Approximately 17 hours after operation, the animals were killed using ether and an autopsy was performed on each. The contents of the stomach were checked for volume, pH, and presence of particulate matter. The following classification was adapted to describe the appearance of the gastric wall:

x: not suitable for classification
o: normal appearance
±: redness, petichiae or "erosion" without definite ulcer
+: 1 or 2 small ulcers (1–2 mm.)
++: 3–5 small ulcers or single large ulcer (greater than 3 mm.)
+++: extensive ulceration (more than 5 small or 2 large ulcers)
++++: ulcer or ulcers with perforation The materials tested for peptic ulcer inhibition were sodium chloride, the mixture of amino acids, referred to in Example I above, carrageenin, chondroitin sulphate, heparin, dextran, and dextran sulphate.

The results of this example are shown in Table III. Examination of the gastric contents revealed a volume that varied from 6 cc. to 14 cc. with an average of approximately 10 cc. The pH of the gastric contents was determined by indicator tape and ranged from 1.2 to 2.5 except when sodium chloride or Maalox was the agent tested. When conspicuous ulceration did not occur, flecks of material often floated in the fluid.

Gross changes in the esophagus with ulceration and even necrosis of the wall were frequently noted when extensive ulcer formation was present in the stomach. Ulcerations occurred both in the rumen and body of the stomach; perforations were more commonly seen in the body.

Fifty-six percent of the 35 control animals died, many with perforated ulcers and 86% showed conspicuous ulceration. Of the 24 animals treated with sodium chloride, there was a 33% mortality, and there was conspicuous ulceration in 54%. Fifty percent of the rats receiving the mixture of amino acids died, and all such animals developed conspicuous ulcers. With carrageenin the mortality was 20% and the incidence of conspicuous ulcers was 94%. Twenty-six percent of the rats receiving chondroitin sulfate died, and marked ulceration was present in 84% of the rats. Of the rats treated with heparin, 25% died and severe ulceration occurred in 55%. The rats treated with dextran—10% had a mortality rate of 61% with 85% showing conspicuous ulceration. Dextran sulphate was administered in three dose ranges. When the dose of dextran sulphate was increased to 100 mgm., all animals survived and none developed conspicuous ulceration, and even at smaller doses the conspicuous ulceration was low compared to the other materials being evaluated.

TABLE III.—EFFECT OF VARIOUS AGENTS ON THE OCCURRENCE OF ULCERS IN SHAY RATS

| Agent | Total No. of Rats | Mort., percent | No. of Rats With Ulcers | | | | | Percent with conspicuous ulcers (++, +++, ++++) |
|---|---|---|---|---|---|---|---|---|
| | | | 0 | +  | + | ++ | +++ | ++++ | |
| Control (saline 0.9%) | 35 | 56 | 1 | 1 | 4 | 6 | 12 | 10 | 86 |
| NaCl (100 mgm.) | 24 | 33 | 2 | 6 | 3 | 2 | 7 | 4 | 54 |
| Amino acid mixture (100 mgm.) | 10 | 50 | 0 | 0 | 0 | 2 | 2 | 6 | 100 |
| Carrageenin (30 mgm.) | 18 | 20 | 0 | 0 | 1 | 2 | 6 | 9 | 94 |
| Chondroitin $SO_4$ (30 mgm.) | 19 | 26 | 1 | 1 | 1 | 2 | 9 | 5 | 84 |
| Heparin (30 mgm.) | 20 | 25 | 2 | 1 | 6 | 5 | 5 | 1 | 55 |
| Dextran 10% (100 mgm.) | 13 | 61 | 0 | 1 | 1 | 1 | 7 | 3 | 85 |
| Dextran $SO_4$ (10 mgm.) | 13 | 23 | 5 | 0 | 3 | 3 | 1 | 1 | 38 |
| Dextran $SO_4$ (25–50 mgm.) | 43 | 16 | 12 | 10 | 15 | 5 | 0 | 1 | 14 |
| Dextran $SO_4$ (100 mgm.) | 22 | 0 | 0 | 4 | 11 | 1 | 0 | 0 | 5 |

EXAMPLE IV

To determine the toxicity of dextran sulphate when administered orally, 100 growing rats varying in weight between about 250 and 450 grams were fed 100 mg. per day of dextran sulphate for a period of one month. No toxic effects were determined. The dextran sulphate utilized was similar to the composition of Example III.

EXAMPLE V

An acid-pepsin mixture, sufficient to provide ulcers, was fed orally to a plurality of dogs. Inflammations and peptic ulcers of the esophagus were uniformly produced. When 12 parts by weight of dextran sulphate were added with the acid-pepsin mixture per 60,000 parts by weight of the dog, inflammations and peptic ulcers were inhibited and were prevented from forming.

What is claimed is:
1. A method of inhibiting the formation of peptic ulcers in a mammal comprising orally administering dextran sulphate having a sulfur content above 13% to a said mammal at a daily dosage of about 8 to 20 parts by weight per 60,000 parts by weight of the mammal, said dextran sulphate dissolving in the stomach of said mammal and inhibiting formation of peptic ulcers.
2. A method in accordance with claim 1 comprising administering said dextran sulphate about 3–4 times daily in a dosage unit of about 1–2 gm. per administration.
3. A method of treating peptic ulcers in a mammal comprising orally administering dextran sulphate having a sulfur content above 13% to a said mammal, at a daily dosage of about 8–20 parts by weight per 60,000 parts by weight of the mammal, said dextran sulphate dissolving in the stomach of said mammal.
4. A method in accordance with claim 3 comprising administering said dextran sulphate about 3–4 times daily in a dosage unit of about 1–2 gm. per administration.

References Cited

UNITED STATES PATENTS

| | | | |
|---|---|---|---|
| 2,774,710 | 12/1956 | Thompson et al. | 167—55 |
| 3,011,949 | 12/1961 | Bilotti | 167—82 |
| 3,141,041 | 7/1964 | Morii et al. | 260—234 |
| 3,126,320 | 3/1964 | Morii et al. | 167—82 |
| 3,155,576 | 11/1964 | Lish et al. | 167—55 |
| 3,175,942 | 3/1965 | Anderson et al. | 167—55 |

FOREIGN PATENTS

| | | |
|---|---|---|
| 715,821 | 9/1954 | Great Britain. |
| 840,623 | 7/1960 | Great Britain. |

OTHER REFERENCES

Anderson: The Antipeptic Activity of Sulphated Polysaccharides, J. Pharm & Pharmacol, vol. 13 (1961), pp. 139–147.

ALBERT T. MEYERS, Primary Examiner

STANLEY J. FRIEDMAN, Assistant Examiner